(12) United States Patent
Lee et al.

(10) Patent No.: US 10,840,685 B2
(45) Date of Patent: Nov. 17, 2020

(54) CABLE-HOLDING DEVICE WITH SEALING ASSEMBLY

(71) Applicant: CONCRAFT HOLDING CO., LTD., Grand Cayman (KY)

(72) Inventors: Chin-Hsing Lee, New Taipei (TW); Heng Yang, Kunshan (CN); Zheng-Xiang Wang, Kunshan (CN)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 198 days.

(21) Appl. No.: 16/168,225

(22) Filed: Oct. 23, 2018

(65) Prior Publication Data

US 2020/0083683 A1 Mar. 12, 2020

(30) Foreign Application Priority Data

Sep. 11, 2018 (TW) .............................. 107131823 A

(51) Int. Cl.
*H02G 3/06* (2006.01)
*H02G 15/013* (2006.01)
*H01R 13/52* (2006.01)
*F16J 15/02* (2006.01)

(52) U.S. Cl.
CPC ............ *H02G 3/0666* (2013.01); *F16J 15/02* (2013.01); *H01R 13/5205* (2013.01); *H02G 15/013* (2013.01)

(58) Field of Classification Search
CPC ............... H02G 3/0666; H02G 15/013; H01R 13/5205; F16J 15/02; F16J 15/06
See application file for complete search history.

(56) References Cited

U.S. PATENT DOCUMENTS

| 3,603,912 | A | 9/1971 | Kelly |
| 6,203,023 | B1 | 3/2001 | Harting et al. |
| 8,979,590 | B2 * | 3/2015 | Magno ................. H02G 15/046 439/607.41 |
| 9,601,914 | B2 * | 3/2017 | Chiu ........................ H01B 7/04 |
| 2011/0226084 | A1 * | 9/2011 | Chiou ..................... F16C 1/107 74/502.4 |

* cited by examiner

*Primary Examiner* — Gilbert Y Lee
(74) *Attorney, Agent, or Firm* — Muncy, Geissler, Olds & Lowe, P.C.

(57) ABSTRACT

A cable-holding device with sealing assembly includes a body having a main unit, a first connecting portion and a second connecting portion, a sealing assembly on the body, and an adjustment element on the second connecting portion. The body has a connecting hole, and the second connecting portion is extended with plural clamping arms. The sealing assembly includes a first sealing portion outside the first connecting portion, a second sealing portion inside the clamping arms to form a tightening port, and a connecting portion between the first sealing portion and the second sealing portion. On the second connecting portion, the adjustment element includes a first movement state which forms a tightening state on the tightening port, and a second movement state which changes the tightening port from the tightening state into a non-tightening state gradually.

10 Claims, 8 Drawing Sheets

CABLE-HOLDING DEVICE WITH SEALING ASSEMBLY

BACKGROUND OF THE INVENTION a) Field of the Invention

The present invention relates to a cable-holding device, and more particularly, a cable-holding device with sealing assembly.

b) Description of the Prior Art

A cable-holding device is used primarily to combine a cable onto a junction box. The cable-holding device should be provided with a good waterproofing effect to keep water vapor or moisture from entering into the junction box through the cable-holding device, thereby preventing electronic components in the junction box from being affected by the water vapor or the moisture to reduce the service life thereof.

A raceway terminator as disclosed in a U.S. Pat. No. 3,603,912 is employed to couple a jacketed flexible metallic raceway to an electrical enclosure. The raceway terminator includes a body portion, a gland nut for assembly therewith, a grounding cone and a sealing ring, wherein the sealing ring has an annular shoulder and tapered leading and trailing edges surrounding the annular shoulder. Upon being screwed with the body portion, the gland nut forms compression to the sealing ring, which engages the flexible metallic raceway on the electrical enclosure to achieve sealing and waterproofing.

Additionally, a cable inlet as disclosed in a U.S. Pat. No. 6,203,023 B1 is employed to connect a cable into an electric box, with that an interior of the cable inlet is provided with a sealing insert. The cable is guided through a pressure screw and the sealing inert to a predetermined depth, and is connected into the electric box. When the pressure screw is to be connected to the electric box, an O-ring is disposed between the pressure screw and the electric box to improve the imperviousness between the pressure screw and the electric box; whereas, the sealing insert increases the imperviousness between the pressure screw and the cable.

However, disregarding the abovementioned sealing ring, O-ring or sealing insert, they are all independent components, and when installing, the sealing ring, the O-ring and the sealing insert are installed respectively on a corresponding location. Therefore, it will cause inconvenience in assembling and can easily result in drop out or loss of the components during the assembling process accidentally.

Accordingly, the technical means and the object to be solved by the present invention are to provide a cable-holding device that is able to improve the assembling efficiency and prevent the sealing assembly from dropping out.

SUMMARY OF THE INVENTION

The primary object of the present invention is to provide a cable-holding device, and more particularly, a cable-holding device with sealing assembly.

To achieve the abovementioned object, the present invention discloses a cable-holding device with sealing assembly, comprising a body, a sealing assembly and an adjustment element. The body is provided with a main unit, a first connecting portion that is extended from the main unit, as well as a second connecting portion that is extended from the main unit and is opposite to the first connection portion. The body is provided with a connecting hole which penetrates the main unit, the first connecting portion and the second connecting portion; whereas, the second connecting portion is extended toward an opposite side to the main unit with plural clamping arms which are disposed annularly on the periphery of connecting hole and are separated from one another. The sealing assembly is disposed on the body, including a first sealing portion outside the first connecting portion, a second sealing portion that is disposed in the clamping arms to form a tightening port, and a connecting portion that is connected between the first sealing portion and the second sealing portion. The adjustment element is disposed outside the second connecting portion and encloses the clamping arms. On the second connecting portion, the adjustment element is provided with a first movement state to move toward the first connecting portion from the second connecting portion, and a second movement state to move toward the clamping arms from the second connecting portion. Upon executing the first movement state, the adjustment element will push the clamping arms toward the second sealing portion, using these clamping arms to force the second sealing portion to allow the tightening port to form a tightening state. On the other hand, when executing the second movement state, the clamping arms will be enabled to move away from the second sealing portion gradually, changing the tightening port into a non-tightening state from the tightening state gradually.

In an embodiment, there is formed with a gap between the clamping arms and the second sealing portion.

In an embodiment, the main unit of the body is provided with a first side and a second side opposite to the first side. The first connecting portion is extended from the first side toward an exterior of the main unit, and the second connecting portion is extended from the second side toward the exterior of the main unit.

In an embodiment, the body includes a line hole that is extended from the first side to penetrate the main unit and the second connecting portion, separating from the connecting hole. Whereas, the connecting portion in the sealing assembly is disposed in the line hole, which enables the first sealing portion to be disposed on the first side and disposed annularly at the periphery of first connecting portion, and enables the second sealing portion to be disposed inside the clamping arms.

In an embodiment, a platform is formed between the connecting hole and the second connecting portion to connect the connecting hole with the second connecting portion; whereas, the line hole is extended between the first side and the platform.

In an embodiment, the platform is further provided with plural first latching portions that are concaved on the platform, and the second connecting portion is formed toward each first latching portion with a second latching portion that is extended into the first latching portion, respectively.

In an embodiment, an oblique notch is formed respectively between any two neighboring clamping arms.

In an embodiment, an interior of the adjustment element is provided with plural oblique bumps opposite to the oblique notches, and each oblique bump is extended into the corresponding oblique notch.

In an embodiment, an interior of the adjustment element is provided with a chamber for accommodating the second connecting portion and a cord hole that penetrates the adjustment element to connect with the chamber. In addition, between the cord hole and the chamber there are formed with a first guiding surface which is extended from the chamber toward the cord hole, and a second guiding surface which is connected between the first guiding surface and the cord hole; whereas, the oblique bumps are disposed on the first guiding surface.

In an embodiment, the second guiding surface is provided with plural tightening bumps that are protruded toward the chamber.

In comparison with the prior art, the cable-holding device with sealing assembly, according to the present invention, is equipped with following advantages:

1. The first sealing portion and the second sealing portion in the sealing assembly are connected together through the connecting portion, which can effectively prevent the first sealing portion and the second sealing portion from dropping out of the first connecting portion and the second connecting portion, respectively.
2. As the oblique bumps are extended into the oblique notches, the adjustment element can be prevented effectively from getting loose under the tightening state.
3. By the tightening bumps, the pushing force of the clamping arms to the second sealing portion increases effectively, allowing the tightening port to result in a stronger tightening force.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
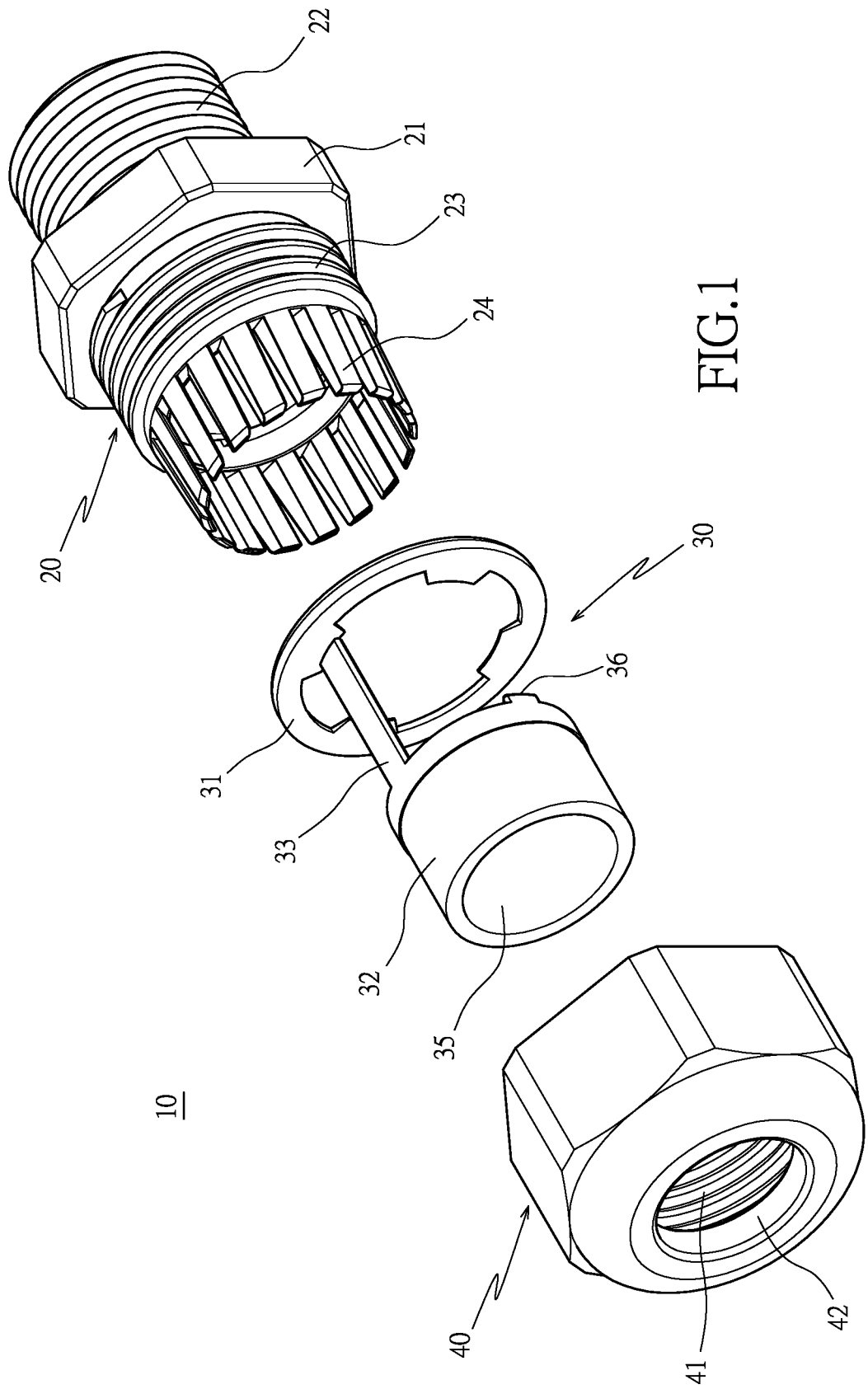
FIG. 1 shows a three-dimensional exploded view of the present invention.
Figure 2:
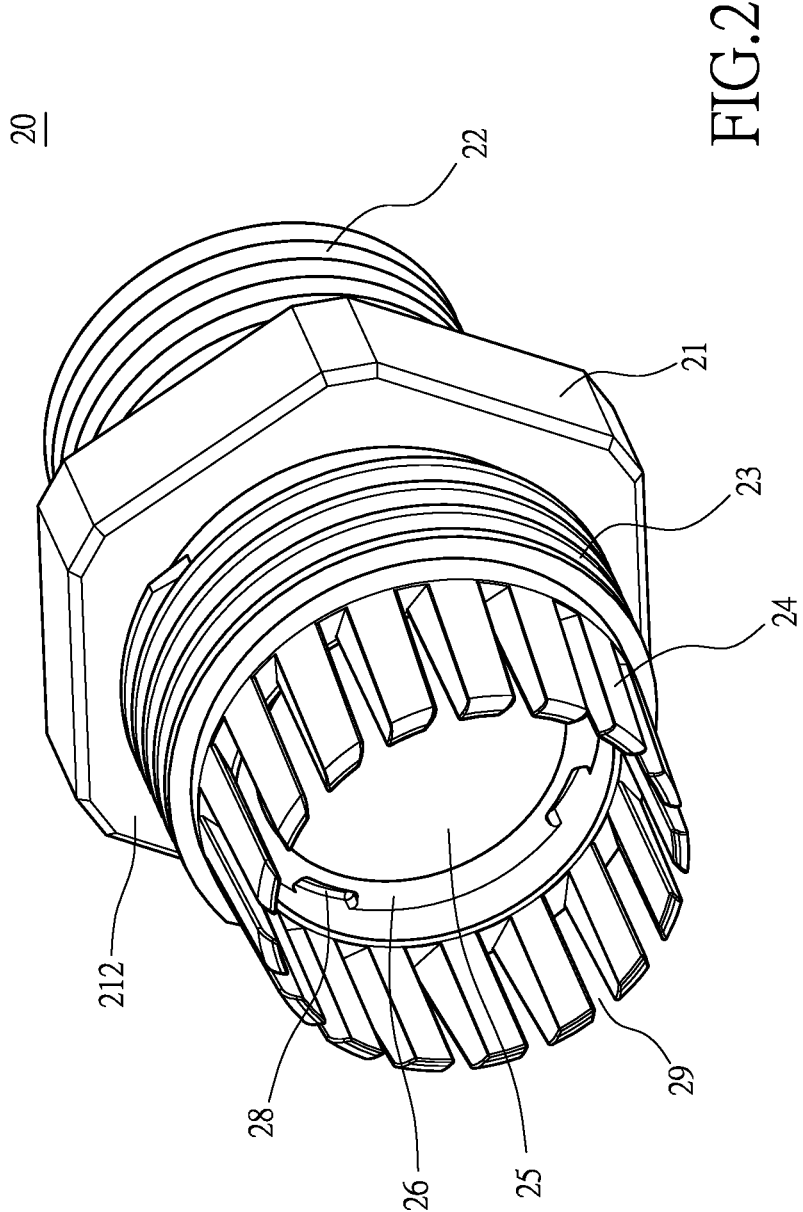
FIG. 2 shows a three-dimensional schematic view of body, according to the present invention.
Figure 3:
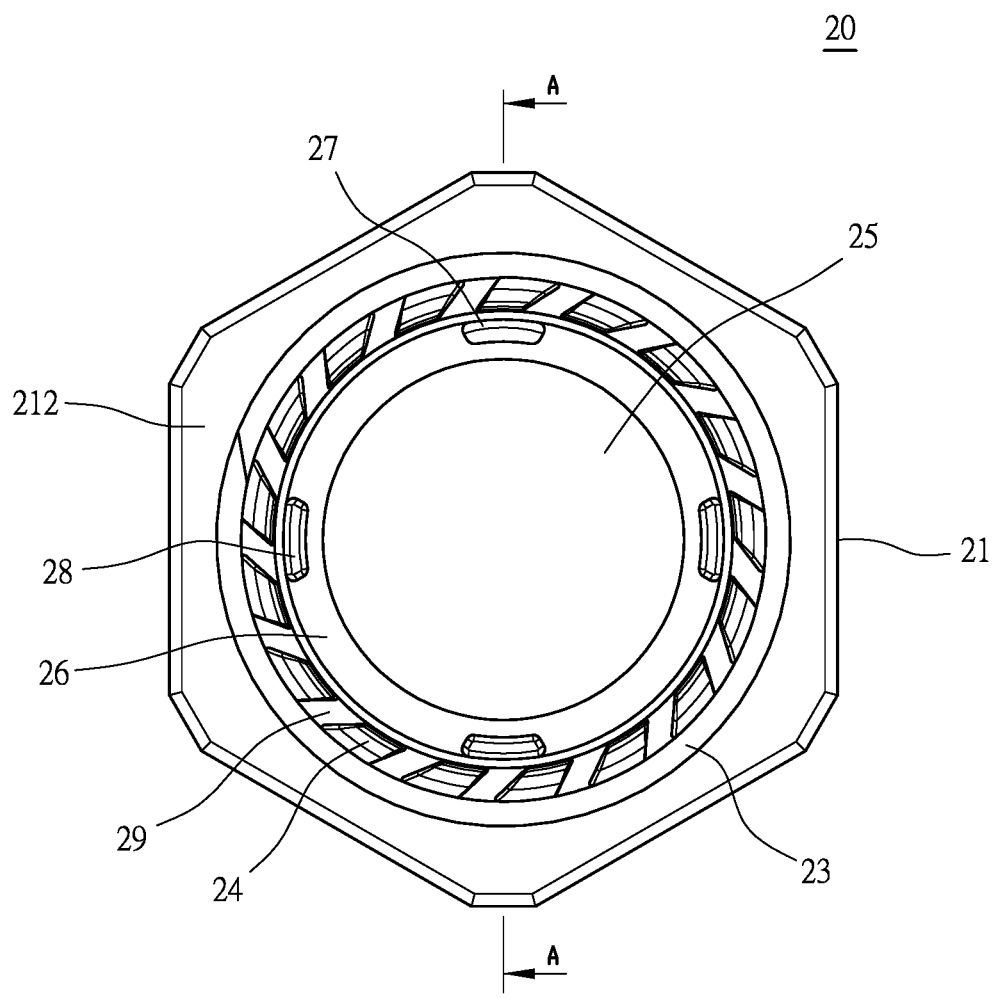
FIG. 3 shows a planar view of the body, according to the present invention.
Figure 4:
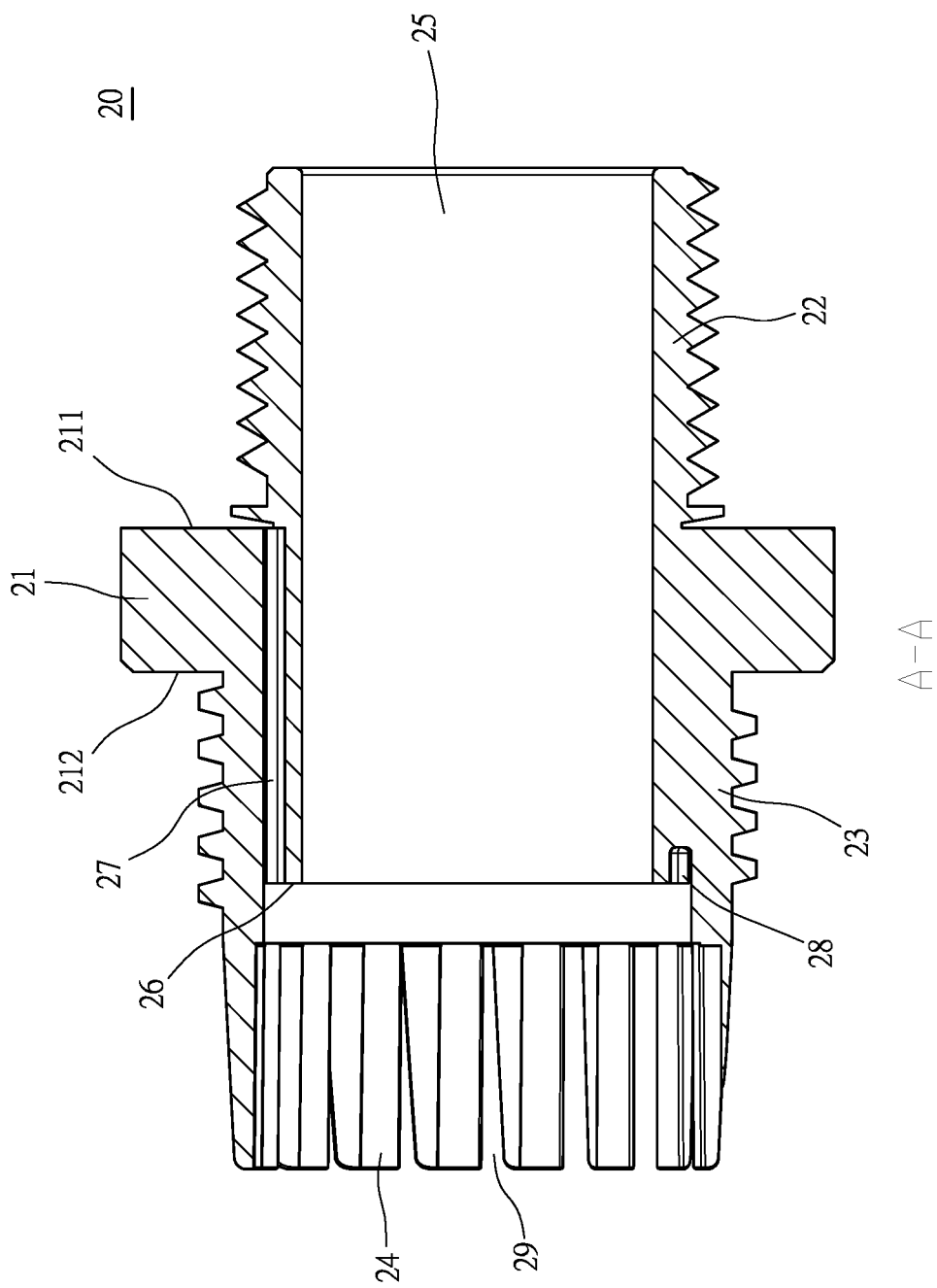
FIG. 4 shows a cutaway view of the body, according to the present invention.

Referring to FIGS. 1 to 5, the present invention discloses a cable-holding device with sealing assembly. The cable-holding device 10 comprises a body 20, a sealing assembly 30 and an adjustment element 40. The body 20 is provided with a main unit 21, a first connecting portion 22 that is extended from the main unit 21, and a second connecting portion 23 that is extended from the main unit 21 and is opposite to the first connecting portion 22. In addition, the second connecting portion 23 is extended toward an opposite side to the main unit 21 with plural clamping arms 24 that are separated from one another. The main unit 21 is provided with a first side 211 and a second side 212 that is opposite to the first side 211. The first connecting portion 22 is extended outward from the first side 211 toward an exterior of the main unit 21. Whereas, the second connecting portion 23 is extended outward from the second side 212 toward the exterior of the main unit 21, which enables the first connecting portion 22 and the second connecting portion 23 to be disposed respectively on two opposite sides of the main unit 21. It is worthy of mentioning that in the present embodiment, external surfaces of the first connecting portion 22 and the second connecting portion 23 are formed respectively with a thread. An interior of the body 20 is provided with a connecting hole 25 that penetrates the main unit 21, the first connecting portion 22 and the second connecting portion 23. An end of the connecting hole 25 is disposed at a center location in the first connecting portion 22, and the other end is disposed at a center location in the second connecting portion 23. A platform 26 is formed between the connecting hole 25 and the second connecting portion 23 to connect the connecting hole 25 with the second connecting portion 23; whereas, a line hole 27 is disposed between the platform 26 and the first side 211 of the main unit 21. The line hole 27 is extended from the first side 211 to penetrate the main unit 21 and the second connecting portion 23, and is separated from the connecting hole 25. In addition, the platform 26 is further provided with plural first latching portions 28 that are concaved on the platform 26. The clamping arms 24 are annularly disposed at the periphery of connecting hole 25, and an end of each clamping arm 24 is connected on the second connecting portion 23, with the other end being a movable end. Furthermore, an oblique notch 29 is disposed between any two neighboring clamping arms 24, so that each clamping arm 24 can have an elastic force on the second connecting portion 23, using the second connecting portion 23 as a pivot.

The sealing assembly 30 is provided with a first sealing portion 31, a second sealing portion 32 which is separated from the first sealing portion 31, and a connecting portion 33 which connects the first sealing portion 31 with the second sealing portion 32. The first sealing portion 31 is disposed on the first side 211 of the main unit 21 and is annularly disposed outside the first connecting portion 22. The second sealing portion 32 is disposed inside the clamping arms 24, and a gap 34 is formed between the second sealing portion 32 and the clamping arms 24. Additionally, an interior of the second sealing portion 32 is provided with a tightening port 35 that is connected with the connecting hole 25. The connecting portion 33 is disposed inside the line hole 27 and is connected with the first connecting portion 22 on the first side 211; whereas, the connecting portion 33 is connected with the second connecting portion 23 on the platform 26. Therefore, the sealing assembly 30 can be actually disposed on the main unit 21. In addition, the second connecting portion 23 is provided with plural second latching portions 36 opposite to the first latching portions 28 in the direction of the platform 26, and each second latching portion 36 is latched into each first latching portion 28. It is worthy of mentioning that in the present embodiment, the sealing assembly 30 is directly formed on the body 20 by injection molding. It means that after the body 20 is formed, the body 20 is emplaced into a mold (not shown in the drawings), and then liquid silica gel is injected into the mold, forming the sealing assembly 30 on the body 20 when the liquid silica gel is cooled down and solidified in the mold.

The adjustment element 40 is disposed outside the second connecting portion 23 and encloses the clamping arms 24. An interior of the adjustment element 40 is provided with a chamber 41 to accommodate the second connecting portion 23 and the clamping arms 24. An interior of the chamber 41 is provided with an inner thread corresponding to the outer thread of the second connecting portion 23, allowing the adjustment element 40 to be screwed on the second connecting portion 23. In addition, the adjustment element 40 is also provided with a cord hole 42 that penetrates the adjustment element 40 and is connected with the chamber 41. Whereas, between the chamber 41 and the cord hole 42, there are formed with a first guiding surface 43 which is extended from the chamber 41 toward the cord hole 42, and a second guiding surface 44 which is connected between the first guiding surface 43 and the cord hole 42. The first guiding surface 43 is provided with plural oblique bumps 45 corresponding to the oblique notches 29, and the second guiding surface 44 is provided with plural tightening bumps 46 which are protruded toward the chamber 41. In addition, the first guiding surface 43 and the second guiding surface 44 are oblique surfaces with different slopes.

Figure 5:
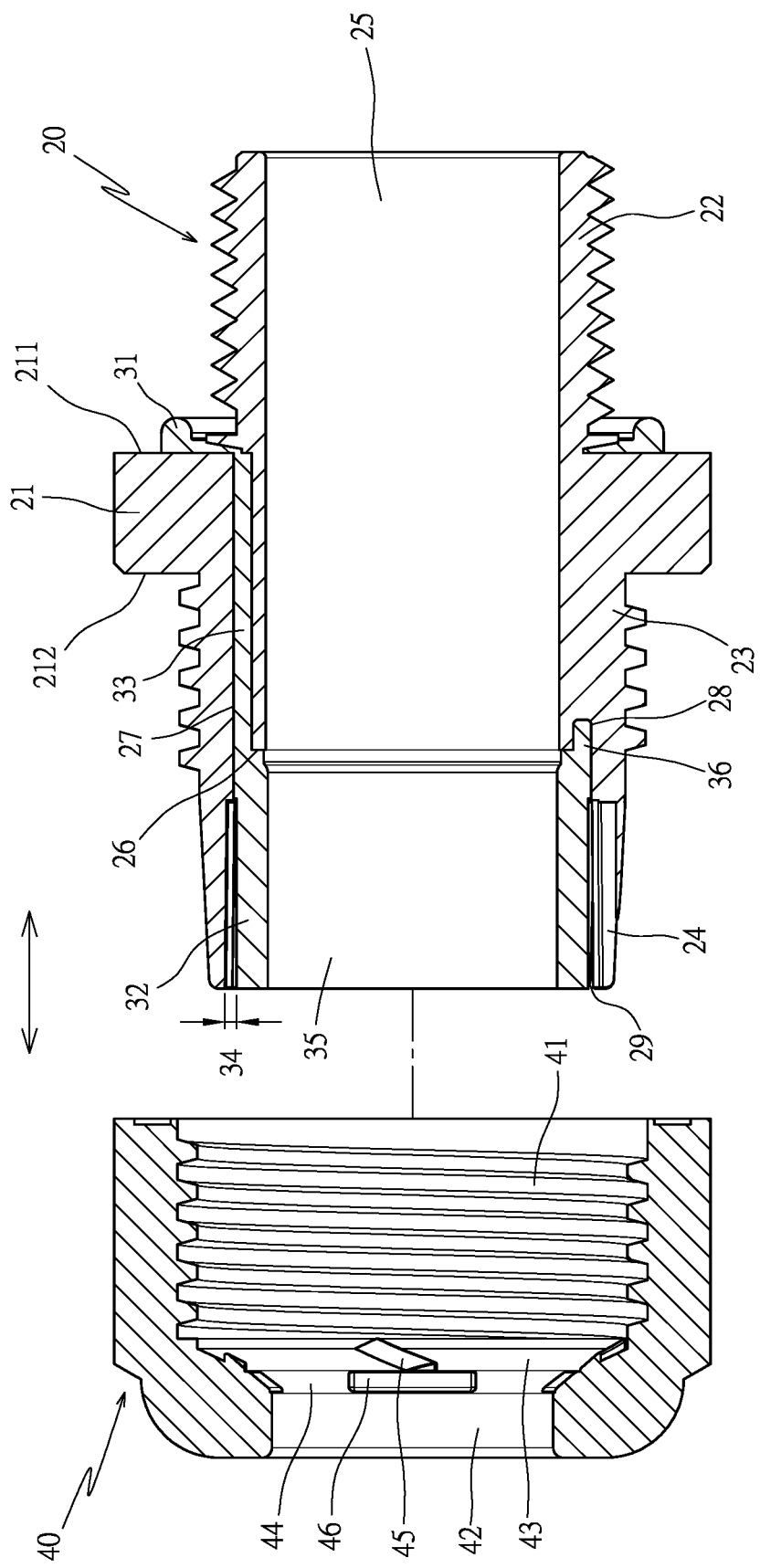
FIG. 5 shows a cutaway and exploded view of the present invention.
Figure 6:
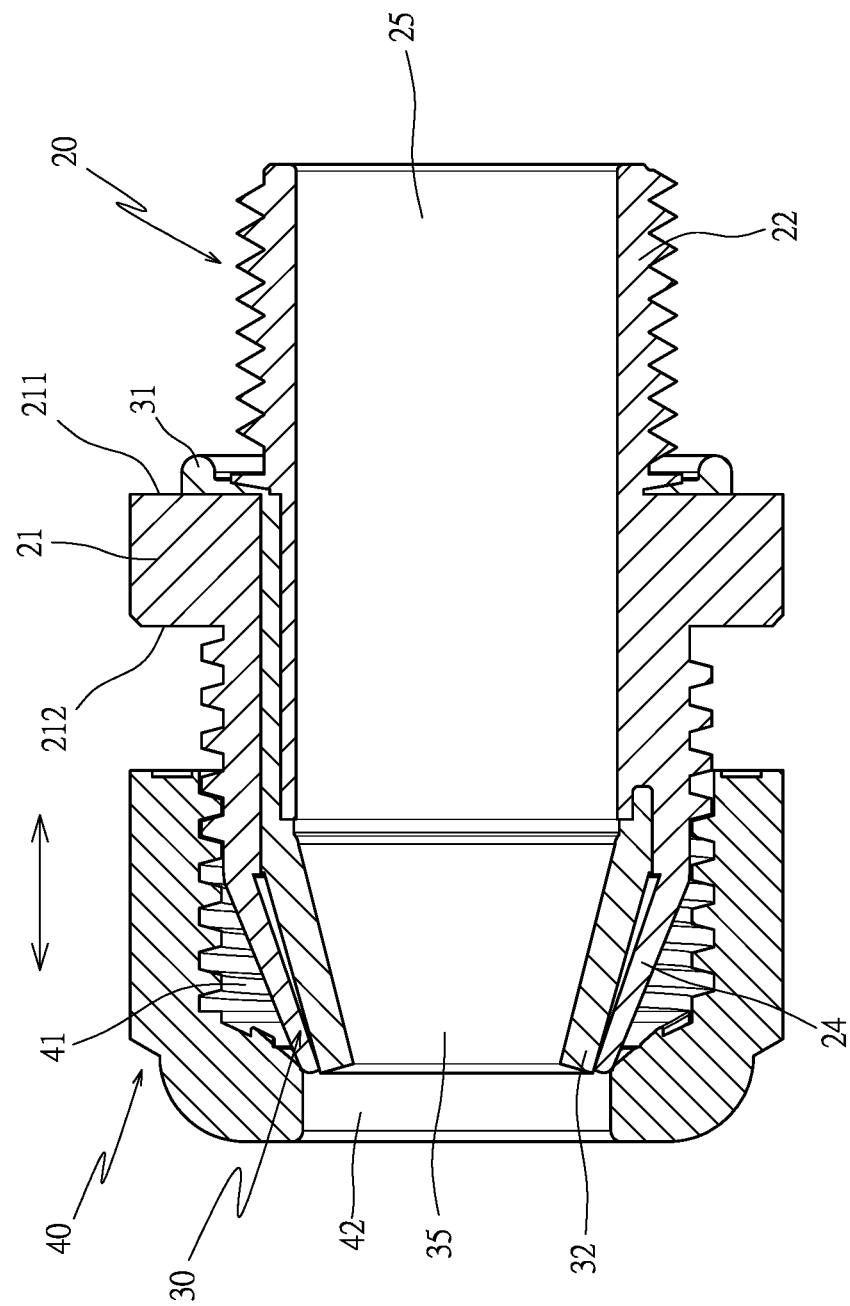
FIG. 6 shows a cutaway view of the present invention, under a non-tightening state.
Figure 7:
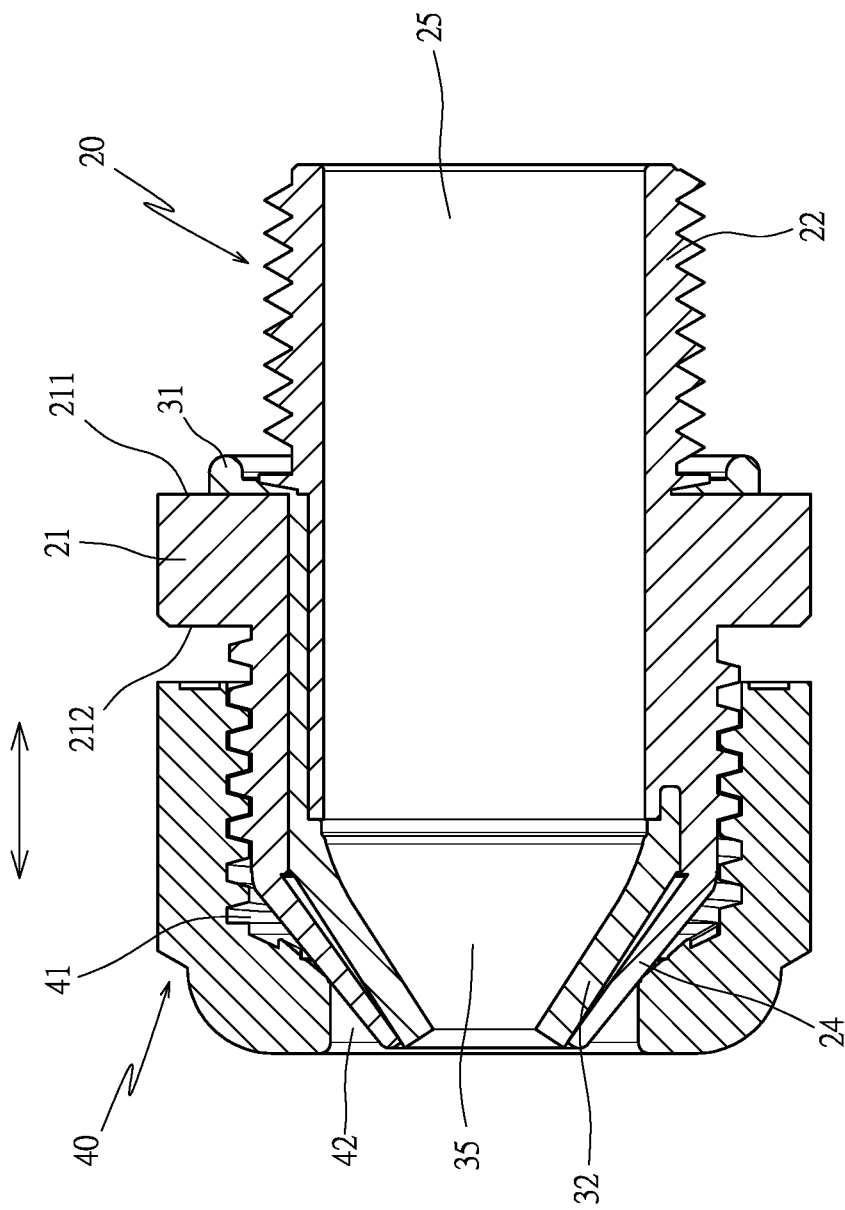
FIG. 7 shows a cutaway view of the present invention, under a tightening state.
Figure 8:
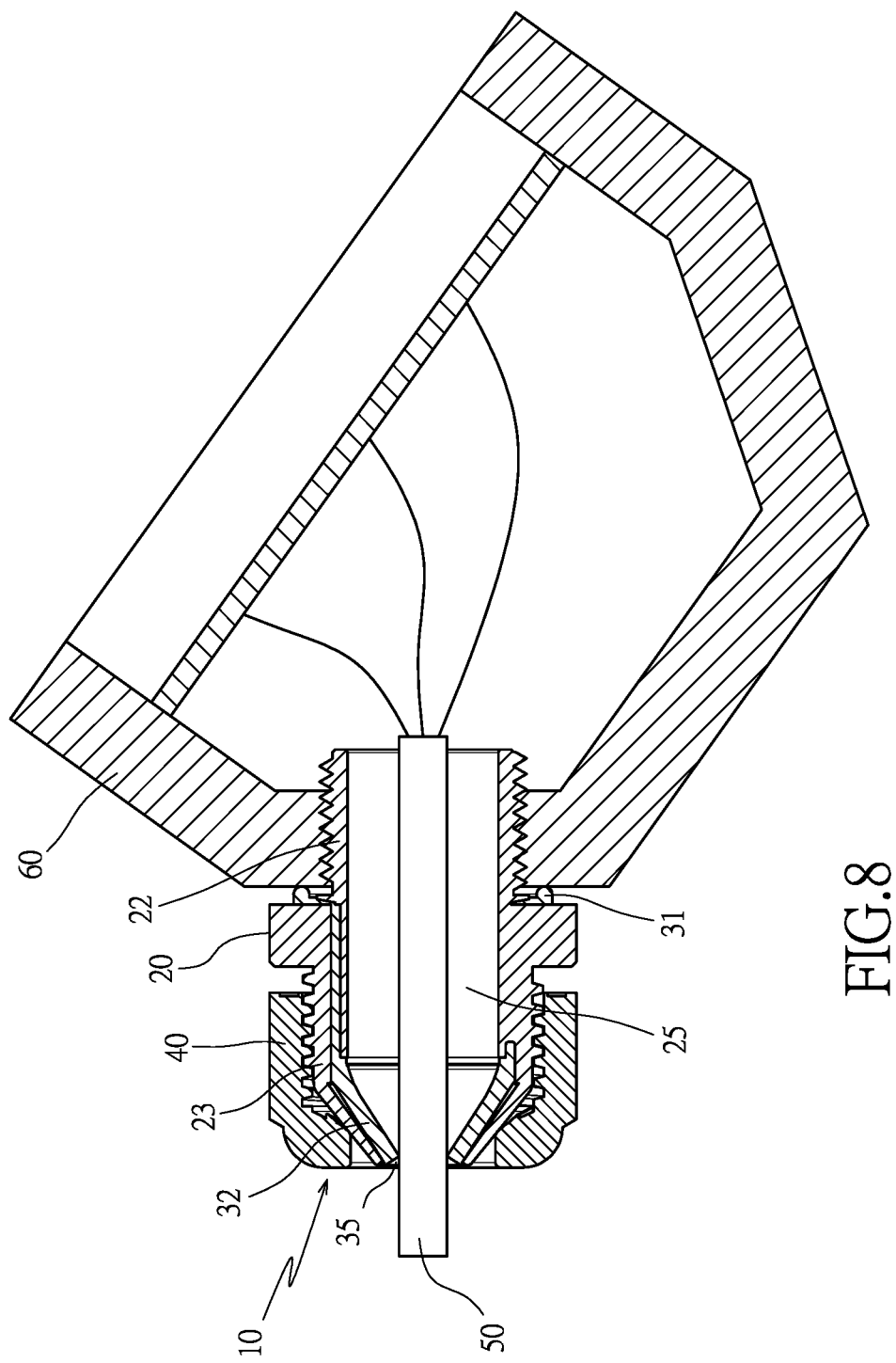
FIG. 8 shows a reference diagram in a use state of the present invention.

Referring to FIGS. 5 to 7, when the adjustment element 40 is assembled on the second connecting portion 23 of the body 20, the assembling is primarily accomplished through screwing between the inner thread and the outer thread. Therefore, the adjustment element 40 can have a first movement state on the second connecting portion 23 toward the first connecting portion 22, as well as a second movement state on the second connecting portion 23 toward the clamping arms 24.

Upon executing the first movement state on the second connecting portion 23, the adjustment element 40 will displace toward the first connecting portion 22, allowing the clamping arms 24 to be guided by the first guiding surface 43 in the chamber 41 of the adjustment element 40. Whereas, a tail end of each clamping arm 24 will push toward the second sealing portion 32 to compress the second sealing portion 32, which forms a tightening state to the tightening port 35 in the second sealing portion 32 gradually, allowing the aperture of the tightening port 35 to be reduced gradually. Because each oblique bump 45 is protruded into the oblique notch 29 between two neighboring clamping arms 24, when the adjustment element 40 is adjusted to a proper location, a stopping function can be formed to the clamping arms 24 through the oblique bumps 45. This will prevent the adjustment element 40 from moving reversely on the second connecting portion 23, keeping the tightening port 35 at the tightening state effectively. On the other hand, when passing through the second guiding surface 44 that is provided with plural tightening bumps 46, the clamping arms 24 passing through the tightening bumps 46 can exert a larger push force to the second sealing portion 32, allowing the second sealing portion 32 to increase a tightening force under the tightening state.

Furthermore, when executing the second movement state on the second connecting portion 23, the adjustment element 40 will displace toward the clamping arms 24, allowing each clamping arm 24 to move away from the first guiding surface 43 gradually. At this time, the push force to each clamping arm 24 by the adjustment element 40 will diminish gradually, allowing each clamping arm 24 to result in a rebound effect away from the second sealing portion 32, so that the tightening port 35 of the second sealing portion 32 can change from the tightening state into a non-tightening state gradually. It means that when the adjustment element 40 executes the second movement state, the aperture of the tightening port 35 will enlarge gradually to form the non-tightening state.

As shown in FIG. 5 to FIG. 8, the cable-holding device 10 disclosed by the present invention is used primarily to secure a cable 50 onto a junction box 60 to prevent water vapor or moisture from entering into the junction box 60 via the cable 50 or the cable-holding device 10, causing short-circuit or damage to the circuit. The cable-holding device 10 is locked on the junction box 60 through the first connecting portion 22; whereas, the cable 50 is made to pass through the connecting hole 25 and the tightening port 35 from within the junction box 60, and then extends out of the cable-holding device 10.

When the body 20 is locked on the junction box 60 through the first connecting portion 22, as the first sealing portion 31 is disposed on the first side 211 of the main unit 21, the first sealing portion 31 can be clipped between the main unit 21 and the junction box 60. The larger a locking force by which the first connecting portion 22 is locked on the junction box 60 is, the better the sealing effect of the first sealing portion 31 between the main unit 21 and the junction box 60 will be. Accordingly, the water vapor or moisture can be kept from entering into the junction box 60 between the first connecting portion 22 and the junction box 60 effectively.

When the cable 50 passes through the tightening port 35, the adjustment element 40 will execute the first movement state on the second connecting portion 23, allowing the tightening port 35 of the second sealing portion 32 to form the tightening state on the cable 50. Therefore, the second sealing portion 32 will be subjected to the push forces of the clamping arms 24 to enclose the cable 50 tightly. This can similarly prevents the water vapor or moisture from entering into the junction box 60 between the cable 50 and the second sealing portion 32 effectively, so that the entire cable-holding device 10 can be equipped with the good water-proofing effect.

On the other hand, as the first sealing portion 31 and the second sealing portion 32 in the sealing assembly 30 are interconnected via the connecting portion 33, a mutual competing phenomenon can be formed between the first sealing portion 31 and the second sealing portion 32 through the connecting portion 33. Therefore, this can prevent effectively the first sealing portion 31 and the second sealing portion 32 from escaping from the first connecting portion 22 and the second connecting portion 23, respectively. Moreover, as the sealing assembly 30 is directly formed on the body 20 by injection molding, the first sealing portion 31 and the second sealing portion 32 can be formed directly on the body 20, saving the time in assembling the cable-holding device 10 on the junction box 60 to improve the assembling efficiency of the cable-holding device 10.

As shown in FIGS. 1 to 8, the first sealing portion 31 and the second sealing portion 32 in the sealing assembly 30 are interconnected via the connecting portion 33, which can prevent effectively the first sealing portion 31 and the second sealing portion 32 from escaping from the first connecting portion 22 and the second connecting portion 23, respectively. In addition, as the sealing assembly 30 has been already formed directly on the body 20, there is no need to install the sealing assembly 30 additionally, which is able to improve the assembling efficiency effectively. On the other hand, the adjustment element 40 is extended into the oblique notches 29 through the oblique bumps 45, which can effectively prevent the adjustment element 40 from getting loose under the tightening state. In addition, using the tightening bumps 46 can effectively increase the push forces of the clamping arms 24 to the second sealing portion 32, allowing the tightening port 35 to result in a stronger tightening force.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A cable-holding device with sealing assembly, comprising:
a body, which is provided with a main unit, a first connecting portion extending from the main unit and a second connecting portion extending from the main unit and being opposite to the first connecting portion, with that the body is provided with a connecting hole which penetrates the main unit, the first connecting portion and the second connecting portion, and the second connecting portion is extended toward an opposite side to the main unit with plural clamping arms disposed annularly at a periphery of the connecting hole and being separated from one another;
a sealing assembly, which is disposed on the body and includes a first sealing portion being disposed outside the first connecting portion, a second sealing portion being disposed inside the clamping arms to form a tightening port, and a connecting portion being connected between the first sealing portion and the second sealing portion; and
an adjustment element, which is disposed outside the second connecting portion to enclose the clamping arms, including a first movement state on the second connecting portion to move from the second connecting portion toward the first connecting portion and a second movement state on the second connecting portion to move from the second connecting portion toward the clamping arms;
wherein, upon executing the first movement state, the adjustment element pushes the clamping arms toward the second sealing portion, using the clamping arms to compress the second sealing portion to form a tightening state to the tightening port; whereas, upon executing the second movement state, the adjustment element enables the clamping arms to move away from the second sealing portion gradually, changing the tightening port from the tightening state into a non-tightening state gradually.

2. The cable-holding device with sealing assembly according to claim 1, wherein a gap is formed between the clamping arms and the second sealing portion.

3. The cable-holding device with sealing assembly according to claim 1, wherein the main unit of the body is provided with a first side and a second side opposite to the first side, the first connecting portion is extended toward an exterior of the main unit from the first side, and the second connecting portion is extended toward the exterior of the main unit from the second side.

4. The cable-holding device with sealing assembly according to claim 3, wherein an interior of the body is provided with a line hole which is extended from the first side to penetrate the main unit and the second connecting portion, separating from the connecting hole; and the connecting portion of the sealing assembly being disposed in the line hole, enabling the first sealing portion to be disposed on the first side and disposed annularly at a periphery of the first connecting portion, and the second sealing portion to be disposed inside the clamping arms.

5. The cable-holding device with sealing assembly according to claim 4, wherein a platform is formed between the connecting hole and the second connecting portion to connect the connecting hole with the second connecting portion, and the line hole is extended between the first side and the platform.

6. The cable-holding device with sealing assembly according to claim 5, wherein the platform is further provided with plural first latching portions that are concaved on the platform, and the second connecting portion is formed with a second latching portion toward each first latching portion, with that each second latching portion is extended into each first latching portion.

7. The cable-holding device with sealing assembly according to claim 1, wherein an oblique notch is formed between any two neighboring clamping arms.

8. The cable-holding device with sealing assembly according to claim 7, wherein an interior of the adjustment element is provided with plural oblique bumps opposite to the oblique notches, with that each oblique bump is extended into the corresponding oblique notch.

9. The cable-holding device with sealing assembly according to claim 8, wherein the interior of the adjustment element is provided with a chamber to accommodate the second connecting portion and a cord hole, with that the cord hole penetrates the adjustment element and is interconnected with the chamber; between the cord hole and the chamber there being formed with a first guiding surface which is extended from the chamber toward the cord hole, and a second guiding surface which is connected between the first guiding surface and the cord hole; and the oblique bumps being disposed on the first guiding surface.

10. The cable-holding device with sealing assembly according to claim 9, wherein the second guiding surface is provided with plural tightening bumps which are protruded toward the chamber.

* * * * *